TAPE REEL IDENTIFYING ARRANGEMENT EMPLOYING
LIGHT REFLECTIVE CODED LABEL

Filed July 15, 1966

INVENTOR.
DYSART A. RAVENHALL
BY GEORGE SCHWENDER
Roland A. Anderson
Attorney

United States Patent Office 3,458,706
Patented July 29, 1969

3,458,706

TAPE REEL IDENTIFYING ARRANGEMENT EMPLOYING LIGHT REFLECTIVE CODED LABEL

Dysart A. Ravenhall, Quogue, and George Schwender, Shoreham, N.Y., assignors to the United States of America as represented by the United States Atomic Energy Commission Filed July 15, 1966, Ser. No. 565,495
Int. Cl. G01n *21/30*
U.S. Cl. 250—219 3 Claims

ABSTRACT OF THE DISCLOSURE

A tape reel identification system including a label on the side of the reel incorporating discrete areas of reflecting and non-reflecting surfaces. On a stationary plate facing the label which is rotating with the reel is a stationary element having a light directing unit and a photo-sensitive device to detect reflected light. The coded reflected light identifies the reel to the computer.

Background of the invention

The invention described herein was made in the course of, or under a contract with the U.S. Atomic Energy Commission.

This invention relates to the identification of a storage device such as a reel carrying computer tape in which the outside of the reel is provided with coded markings and the reel supporting structure is equipped with sensing devices to read the markings.

In many modern computer installations a large number of tape reels are stored and used in connection with the various programs for which the equipment is designed and used. Some type of tape identification scheme is therefore obviously necessary and in fact there are schemes which have been proposed or used. Most such arrangements attempt to identify the reels themselves and the data recorded upon the tapes. These schemes can and have become quite elaborate, difficult to maintain and burdensome on the user.

In a typical identification system, the reel is provided with some sort of an identifying number upon which the operator relies for taking the reel from the library and mounting it on the tape deck. The tape itself is coded with information at the beginning so that in theory at least a mistake in the selection of the reel should be detected. However, when the end of the tape containing the information becomes worn, as it does occur with frequently used tapes, an error on the part of the operator in selecting the reel would and has in the past caused considerable delay and expense in rectifying the mistake, as well as wasting very expensive computer time.

Description of the invention

The present invention avoids the above-mentioned difficulties and other problems associated with arrangements presently in use for identifying the tapes to be used in a computer installation. In accordance with the principles of this invention, identification of the reel is made completely independent of the data recorded on the tape. The reel numbering system is organized around a label permanently fixed to the reel itself which is read directly by the computer after it is mounted. A reading device mounted on the back plate of each tape drive directly facing the side of the reel having the label affixed automatically reads the latter and will indicate which tape reel has been selected and mounted.

It is thus a principal object of this invention to provide for the identification of tape reels in a way capable of indicating which reel has been utilized when data is to be recorded, that this reel is available for recording and that the correct reel has been selected and mounted when access to this same data is required.

Other objects and advantages of this invention will become readily apparent from the following description of a preferred embodiment of this invention taken with reference to the accompanying drawing in which.

Figure 1:
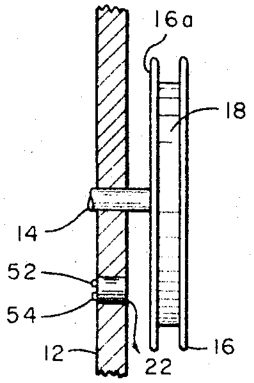
FIG. 1 is a view along 1—1 of FIG 2.

Referring to FIG. 1 there is shown a tape transport base plate 12 through which extends a shaft 14 on which is supported a tape reel 16 carrying computer tape 18. As is understood in the art, tape 18 would unwind through a magnetic head (not shown) to another tape reel (not shown) for the purpose of adding to, extracting from or using information in tape 18.

Figure 2:
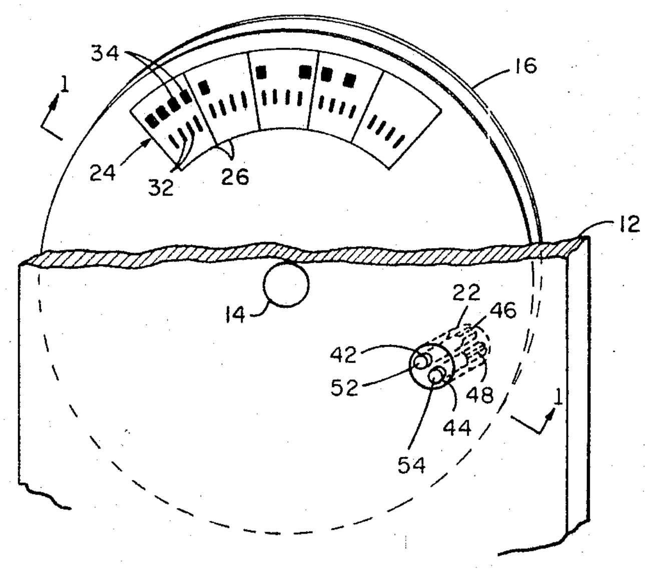
FIG. 2 is an elevation view with the mounting plate partially cut away.
Figure 4:
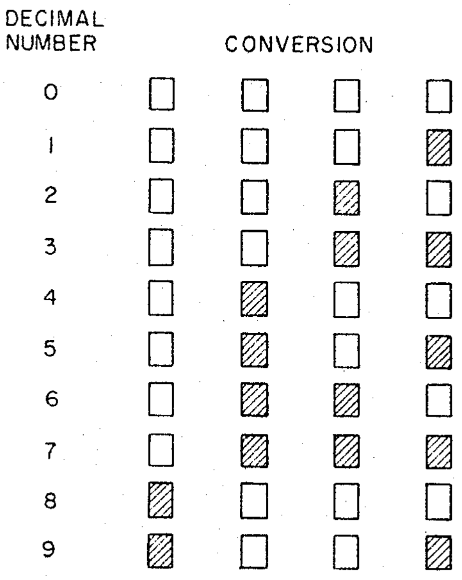
FIG. 4 illustrates a typical coding arrangement which can be used to identify a tape reel.
Figure 3:
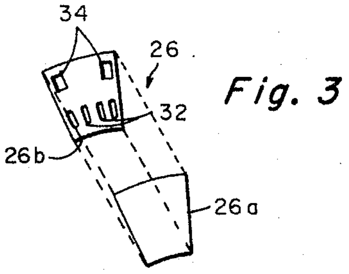
FIG. 3 is an expanded view of one of the labels shown mounted in FIG. 2.
Figure 5:
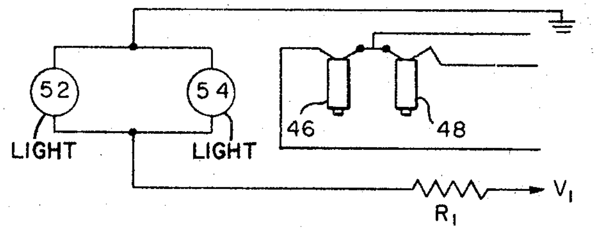
FIG. 5 is a schematic of the wiring for the sensing unit.

Also mounted through plate 12 is a photodiode sensing unit 22 which in accordance with this invention senses information placed on the facing side wall **16*a* of reel 16 in the manner to be described below. Referring to FIG. 2, it will be noted that reel 16 is provided with a label 24 which consists of a plurality of wedge-shaped segments 26 circumferentially arranged to carry the identifying marks of said reel. In the particular embodiment shown, as particularly illustrated in FIG. 3, each segment 26 consists of an adhesive backed silver coated sheet 26*a* stuck to reel 16 and superimposed on sheet 26*a* is an outer black sheet 26*b* with an adhesive backing to cause the latter to be stuck to the underlayered silver coated sheet 26*a*. Outer black sheet 26*b* is provided with a pattern of a circumferentially arranged inner array or row of spaced openings 32 and an outer array or row of somewhat larger openings 34. The inner, smaller openings 32 are equally spaced strobe marks for indexing purposes while the outer, larger openings 34 represent characters for identifying purposes. The number and positioning of each opening 34 aligned with a strobe opening 32 indicate a decimal number as illustrated by the schedule shown in FIG. 4. The first and last of segments 26** can be used to produce a character to begin and end, respectively, the reading of the characters.

For reading coded label 24, reference is made again to FIG. 2 for a description of sensing unit 22. This unit is a solid cylindrical member of opaque plastic and penetrates plate 12 so that the head of the former faces reel 16 and label 24 in particular. As reel 16 rotates, label 24 will slide pass unit 22. The latter contains a pair of cylindrical transparent Lucite elements 42 and 44 mounted in and extending through to the inner face of plate 12. The inside ends of elements 42 and 44 are flush against the surface of plate 12 facing reel 16. The inner face of element 44 is directly opposite identifying openings 34 to respond to reflections from the latter whereas element 42 is directly opposite and faces strobe openings 32 for a similar purpose. Mounted in the center of Lucite elements 42 and 44 are a pair of photodiode sensing units 46 and 48, respectively, designed to pick up light reflected from the silver surfaces shining through openings 32 and 34. A pair of lights 52 and 54 are mounted in the rear of Lucite elements 42 and 44, respectively, so that the light is carried down the lengths of these elements and is directed on label 24. As the latter sweeps by unit 22, electrical pulses from the intermittent reflected light produced by openings 32 and 34 are generated by photodiode units 46 and 48 and these pulses are transmitted to the computer (no shown) to be compared by an operator or internally in the computer with reel called for or programmed for. Suitable wiring shown in FIG. 4 carry away the various signals from diodes 46 and 48, and energize electric lights 52 and 54.

It is thus seen that there has been provided a simple but dependable way of identifying a tape reel or similar device with a minimum reliance on an operator. While only a preferred embodiment of the invention has been described it is understood that variations thereof may be made without departing from the principles of this invention. Thus the invention is not to be limited by the embodiment described but is to be defined only by the scope of the appended claims.

What is claimed is:

1. In an information storage reel transport system having a transport base plate for supporting said reel and means for mounting for rotation said reel having a side face parallel to said plate, the improvement comprising:

(a) means on the side of said reel consisting of a label having non-reflective and reflective areas, said areas being arranged to code said reel and to face said plate for identifying said reel; and (b) means extending through said plate facing said reel for reading said identifying means as said reel rotates.

2. The transport system of claim 1 in which said reading means includes in a single element a source of light directed on said label as the latter sweeps by during rotation of said reel and means to detect light reflected from said reflective areas.

3. The transport system of claim 2 in which said non-reflective and reflective areas are arranged into a pair of inner and outer circumferentially patterned arrays, the inner array serving to index the outer array which carries the identifying code.

References Cited

UNITED STATES PATENTS

| | | | |
|---|---|---|---|
| 2,565,266 | 8/1951 | Potts | 250—219 X |
| 3,034,643 | 5/1962 | Keller et al. | 250—219 X |
| 3,303,347 | 2/1967 | Wingate | 250—219 X |

RALPH G. NILSON, Primary Examiner

T. N. GRIGSBY, Assistant Examiner

U.S. Cl. X.R.

250—231